United States Patent
Jaques et al.

(10) Patent No.: US 9,729,958 B2
(45) Date of Patent: Aug. 8, 2017

(54) HEADSET SYSTEM WITH USER-CONFIGURABLE FUNCTION BUTTON

(71) Applicant: VXI CORPORATION, Dover, NH (US)

(72) Inventors: David A. Jaques, Durham, NH (US); Kevin A. Batson, Dover, NH (US); William J. Blank, Jr., Hampton, NH (US); David M. Geno, Rochester, NH (US); Thomas F. Terrien, Jr., Portsmouth, NH (US)

(73) Assignee: GN Audio A/S, Ballerup (DK)

( * ) Notice: Subject to any disclaimer, the term of this patent is extended or adjusted under 35 U.S.C. 154(b) by 0 days.

(21) Appl. No.: 15/181,966

(22) Filed: Jun. 14, 2016

(65) Prior Publication Data
US 2016/0295314 A1    Oct. 6, 2016

Related U.S. Application Data

(62) Division of application No. 14/627,106, filed on Feb. 20, 2015, now Pat. No. 9,398,361.

(51) Int. Cl.
*H04M 1/00* (2006.01)
*H04R 1/10* (2006.01)
(Continued)

(52) U.S. Cl.
CPC .......... *H04R 1/1041* (2013.01); *G06F 3/165* (2013.01); *H04R 1/08* (2013.01); *H04R 1/105* (2013.01);
(Continued)

(58) Field of Classification Search
CPC ................................................. H04M 1/72527
(Continued)

(56) References Cited

U.S. PATENT DOCUMENTS 7,292,880 B2    11/2007    Lehtonen
7,512,414 B2    3/2009    Jannard et al.
(Continued)

FOREIGN PATENT DOCUMENTS

| GB | 2452027 A | 2/2009 |
|---|---|---|
| WO | 2008082245 A1 | 7/2008 |
| WO | 2009005563 A1 | 1/2009 |

*Primary Examiner* — Tu X Nguyen
(74) *Attorney, Agent, or Firm* — McLane Middleton, Professional Association

(57) ABSTRACT

A headset providing audio input and output for a mobile device includes a microphone and speaker. An RF transceiver performs wireless communication with the mobile device. One or more buttons are configured for push operations to control operation of the headset, the mobile device, or both. A processor is configured to process a signal input from the microphone and output the processed signal to the RF transceiver, process a signal received from the RF transceiver and output the processed signal to the speaker, and process a signal input according to the push operations of the one or more buttons. At least one of the buttons is configurable to actuate a selected function. A memory associated with the processor stores program instructions for executing a plurality of functions, wherein the selected plurality of function is selected in response to user input via a user interface on the mobile device.

17 Claims, 5 Drawing Sheets

(51) Int. Cl.
*H04W 4/00* (2009.01)
*G06F 3/16* (2006.01)
*H04R 1/08* (2006.01)
*H04W 88/02* (2009.01)

(52) U.S. Cl.
CPC .......... *H04R 1/1008* (2013.01); *H04W 4/008* (2013.01); *H04R 2201/107* (2013.01); *H04R 2420/07* (2013.01); *H04W 88/02* (2013.01)

(58) Field of Classification Search
USPC ...................................................... 455/575.2
See application file for complete search history.

(56) References Cited

U.S. PATENT DOCUMENTS

| | | | |
|---|---|---|---|
| 7,620,433 B2 | 11/2009 | Bodley | |
| 7,983,722 B2 | 7/2011 | Lowles et al. | |
| 8,041,299 B2 | 10/2011 | Geldbach et al. | |
| 8,064,972 B2 | 11/2011 | McLoone et al. | |
| 8,073,137 B2 | 12/2011 | Weinans et al. | |
| 8,515,503 B2 | 8/2013 | Bodley | |
| 8,600,337 B2 | 12/2013 | Rothschild | |
| 8,688,040 B2 | 4/2014 | Jung | |
| 8,699,741 B2 | 4/2014 | Hestehave | |
| 8,755,845 B2 | 6/2014 | Clark et al. | |
| 9,398,361 B1 | 7/2016 | Jaques et al. | |
| 2007/0197266 A1 | 8/2007 | Chang | |
| 2008/0076389 A1* | 3/2008 | Lee | H04L 63/0492 455/411 |
| 2009/0073950 A1* | 3/2009 | Guccione | H04M 1/05 370/341 |
| 2009/0204410 A1 | 8/2009 | Mozer et al. | |
| 2010/0245585 A1 | 9/2010 | Fisher et al. | |
| 2012/0064922 A1 | 3/2012 | Podoloff et al. | |
| 2016/0165032 A1* | 6/2016 | Chang | H04L 67/142 455/566 |

* cited by examiner

HEADSET SYSTEM WITH USER-CONFIGURABLE FUNCTION BUTTON

CROSS REFERENCE TO RELATED APPLICATION

This application of a divisional application of U.S. application Ser. No. 14/627,106 filed Feb. 20, 2015. The aforementioned application is incorporated by reference in its entirety.

BACKGROUND

The present invention relates to wireless headsets for mobile telephone devices and, more particularly, to a wireless headset having a user-configurable function button which is configurable through an on screen interface of an associated mobile telephone device.

Wireless headsets are known that communicate via a wireless, e.g., radio frequency (RF), interface with a similarly enabled mobile telephone device. Such headsets function as the audio input and output mechanism for the mobile device and are advantageously used in situations where a user wishes talk using the mobile device in hands-free fashion, unencumbered by a wired or cabled connection between the mobile device and the headset. Commonly, headset devices include one or more switches or buttons for controlling operation of the headset and/or the mobile device. Because of size constraints, the number of buttons on such headset devices and the number of functions tend to be limited and any programmable buttons that may be provided tend to be difficult to program.

The present disclosure contemplates a new and improved wireless headset apparatus and method which overcome the above-referenced problems.

SUMMARY

In one aspect, a headset device is configured to provide an audio input and output mechanism for a mobile device. The headset device includes a headset body configured to be worn by a user and a microphone and a speaker installed on the headset. An RF transceiver is received within the headset body and configured to perform wireless communication with the mobile device. One or more buttons provided on the headset body are configured to be subject to push operations for controlling operation of the headset device, the mobile device, or both. A processor is received within the headset body, the processor configured to: (a) process a signal input from the microphone and output the processed signal to the RF transceiver; (b) process a signal received from the RF transceiver and output the processed signal to the speaker; and (c) process a signal input according to the push operations of the one or more buttons. At least one of the buttons is a configurable function button that is configurable by the user to actuate a selected one of a plurality of functions. A memory received within the headset body is associated with the processor and stores program instructions for executing each of the plurality of functions, wherein the selected one of the plurality of functions is pre-selected in response to user input to the processor via a user interface on the mobile device.

In another aspect, a method for configuring a headset device is provided. The headset device is configured to provide an audio input and output mechanism for a mobile device. The method includes providing the headset device, the headset device having a headset body configured to be worn by a user, a microphone and a speaker installed on the headset, an RF transceiver received within the headset body and configured to perform wireless communication with the mobile device, and one or more buttons on the headset body and configured to be subject to push operations, and a processor received within the headset body. The processor is configured to: (a) process a signal input from the microphone and output the processed signal to the RF transceiver; (b) process a signal received from the RF transceiver and output the processed signal to the speaker; and (c) process a signal input according to the push operations of the one or more buttons. Program instructions for executing a plurality of functions for controlling operation of the headset device, the mobile device, or both is stored in a memory received within the headset body and associated with the processor. A user interface for selecting one of the plurality of functions is provided using the mobile device, wherein at least one of the buttons is configured to actuate the selected one of the functions, the selected one of the plurality of functions being pre-selected in response to user input to the processor via the user interface on the mobile device.

BRIEF DESCRIPTION OF THE DRAWING

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Although the present development will be described herein primarily by way of reference to a mobile communication system comprising a Bluetooth-enabled headset and an associated Bluetooth-enabled mobile device, it will be recognized that the present development is equally applicable to other wireless communication protocols, including ZigBee, Wi-Fi, or other low power RF communication standard.

Figure 1:
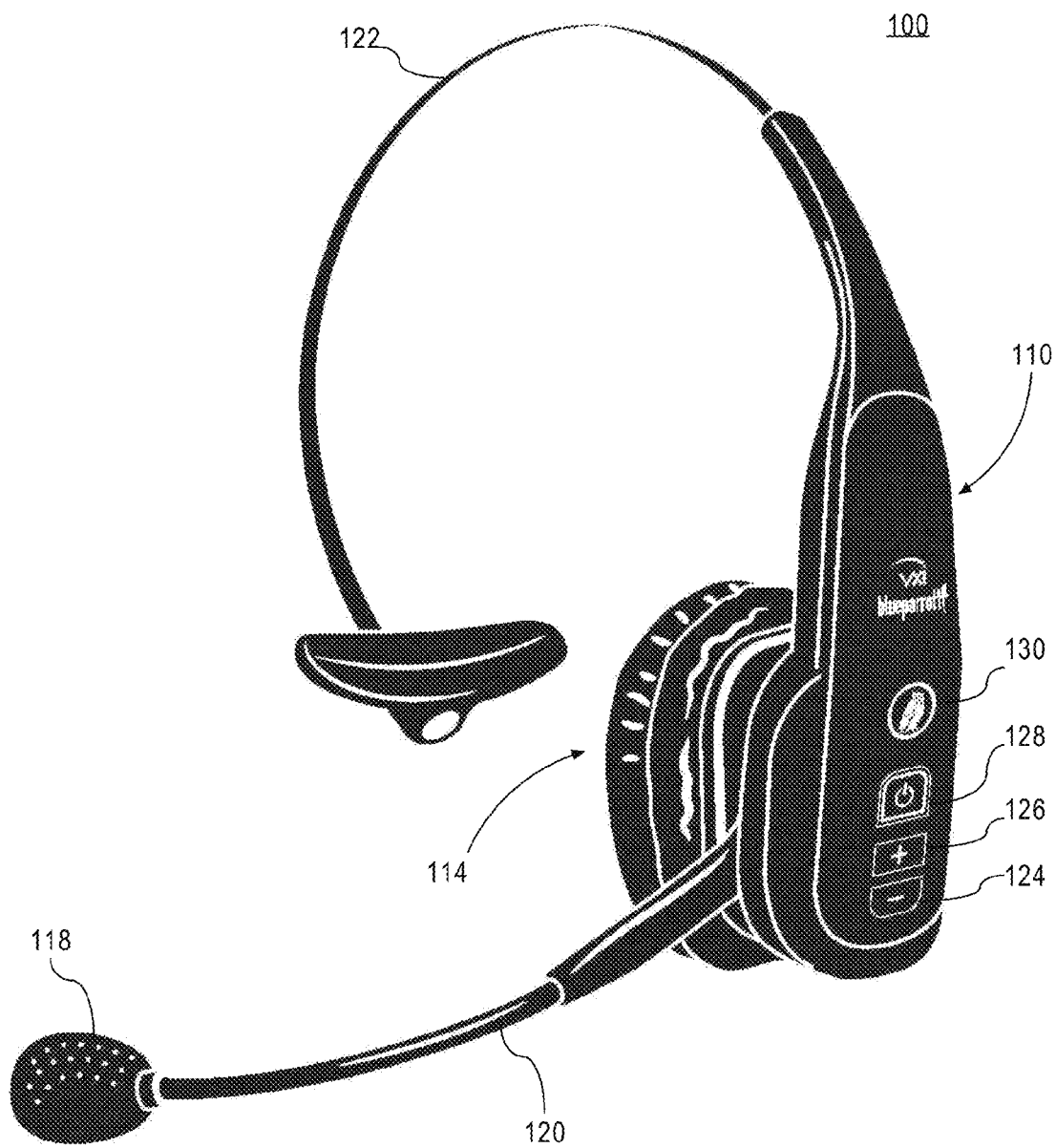
FIG. 1 illustrates a headset according to an exemplary embodiment of the present invention.
Figure 2:
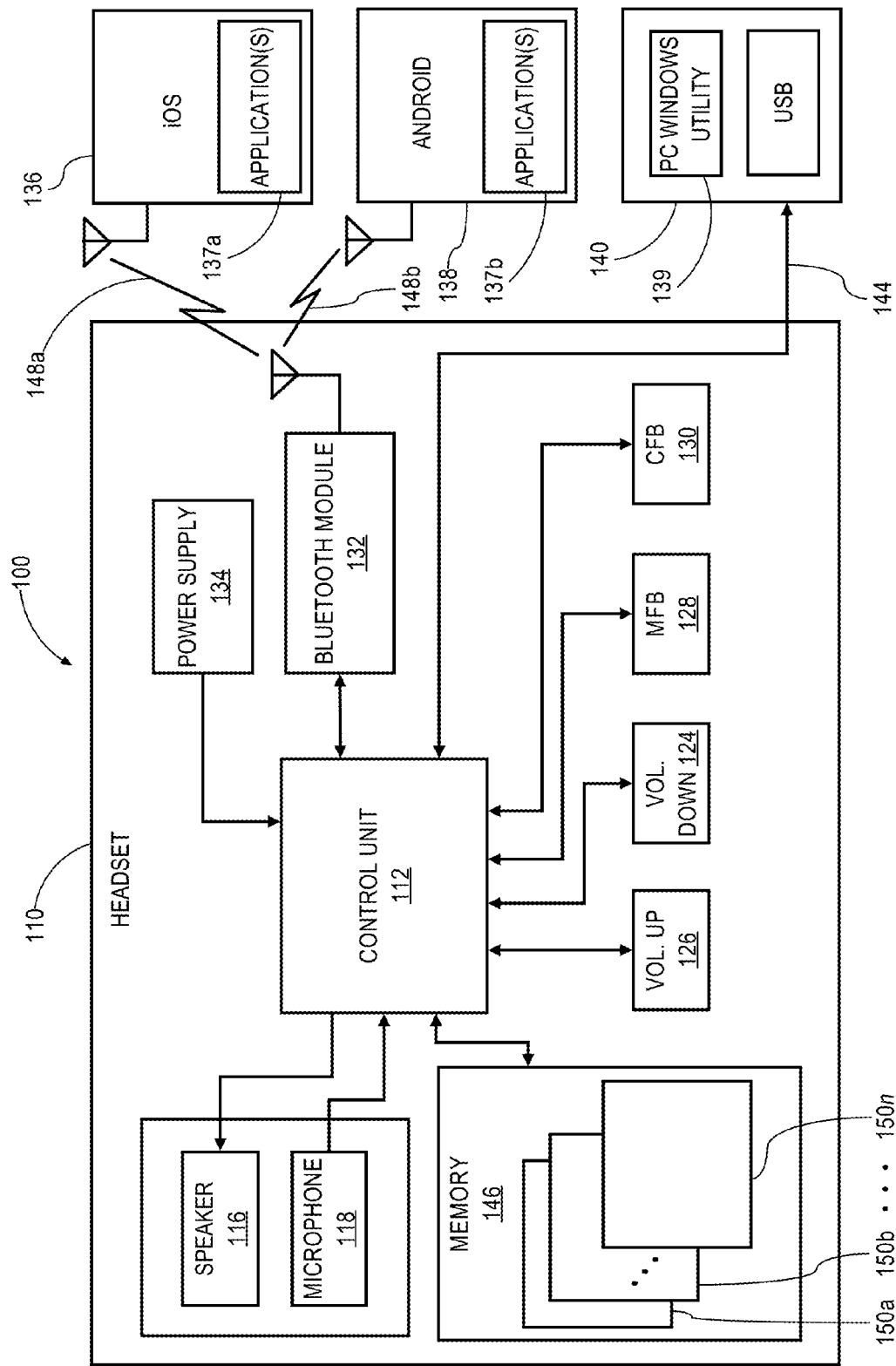
FIG. 2 is a block diagram illustrating a headset system in accordance with the present invention.

Referring now to the drawings, FIGS. 1 and 2 illustrate a headset 100 according to an exemplary embodiment of the present development. The headset 100 includes a body or housing 110 containing a processor 112 and associated electronics. An earpiece 114 contains an audio speaker 116, which receives a speech signal from the processor 112 and converts it into audible form. A microphone 118, which may be located at the end of a boom 120 in proximity with the user's mouth, receives speech and transfers a speech signal to the processor 112.

A headband 122 is adapted to be worn over the user's head to retain the headset 110 in place during use. It will be recognized that other configurations are possible. For example, the illustrated ear cushion type earpiece could be replaced with an ear bud or in-ear type of earpiece. Likewise, the headband 122 could be replaced with an ear hook or ear loop.

A plurality of buttons (four in the illustrated embodiment) are located on the housing 110. Each of the buttons 110 is configured to be manually actuated by the user to input instructions to the control unit 112, referred to herein as volume down button 124, volume up button 126, multifunction button (MFB) 128, and configurable function button (CFB). Although the buttons 124, 126, 128, and 130 are described herein in accordance with their main or nominal functions, it will be recognized that each of the buttons can have multiple functions depending on context, button press duration, button press sequences (e.g., multiple presses of the same or different buttons within a pre-selected time interval), and/or button press combinations, some exemplary embodiments of which will be described in greater detail below.

An RF module 132, e.g., a Bluetooth module, is also housed within the housing 110 to perform wireless communication with a paired mobile device, which in certain embodiments may advantageously be a Bluetooth-enabled smartphone device, such as an iPhone device 136 or an Android phone 138, via a Bluetooth link 148a, 148b, respectively. As used herein, the term "paired" and variants thereof refer to a persistent wireless link established between the headset device and one or more mobile devices. Pairing may involve an authentication step such as the exchange of a passkey between two devices. In certain embodiments, the exchange of a passkey occurs the first time two devices are paired and future connections between the devices are authenticated automatically. The Bluetooth module 132 enables voice and data communication between the headset and the Bluetooth device. In certain embodiments, the headset 100 also communicates with a personal computer 140 via a USB connection 144. In certain embodiments, the computer 140 is a Windows-based PC running software 139, such as a VOIP telephony application or other windows utility or application.

A power supply 134, such as a battery or battery pack, is also housed within the housing 110. In preferred embodiments, the power supply 134 is a rechargeable battery or battery pack that is chargeable via a cabled connection to a charging power supply. For example, the headset housing body may include a charging connector (not shown) for electrically coupling the power supply with a charging power supply such as a vehicle power supply or the AC mains of a building. In certain embodiments, the connector is a female USB connector, mini USB connector, or micro USB connector that provides both charging contacts and data/signal contacts. In this manner, a charging signal may be provided to the headset device using a USB cable and an AC adapter or DC adapter (e.g., 12-volt car adapter). A USB cable coupling the headset device 100 and the host computer 140 may provide a charging signal as well as allow data transfer between the headset device and the host computer.

Alternatively, a charging station or dock (not shown) may be provided. For example, charging contacts (not shown) may be provided on the housing 110 which align with charging contacts on an associated charging cradle for electrically coupling the power supply 134 with a charging power supply, such as the electrical system of a building or vehicle.

The nominal function of the volume down and volume up buttons 124, 126 is to adjust the volume of the speaker (i.e., amplifier output). It will be recognized that in certain embodiments the dedicated volume up and volume down buttons of the illustrated embodiment can be replaced with a single volume button where repeated button presses cycle the volume level through a plurality of preset volume levels. In certain alternative embodiments, the volume can be controlled via a slider or knob (e.g., potentiometer or multi-position switch). The volume up and volume down buttons may have alternative functions as well. For example, in certain embodiments, if the user is on a voice call, pressing and holding the volume down button 124 for some predetermined time period (e.g., 1-2 seconds) causes the processor 112 to send a command to the mobile device via the RF connection to transfer the audio connection from the headset 100 to the mobile device or vice versa. In certain embodiments, if the user is not on an ongoing voice call, pressing and holding the volume down button 124 for some predetermined time period causes the control unit to send a command to the mobile device to place an outgoing call using the last number dialed by the mobile device as the destination number. In certain embodiments, if the user is on an ongoing voice call, pressing and holding the volume up button 126 for some predetermined time period (e.g., 1-2 seconds) serves to toggle a mute function on and off.

The MFB 128 performs multiple functions, depending on context. For example, the MFB 128 may function as a power switch for powering the unit 110 on and off. In preferred embodiments, the unit 100 may be programmed, (e.g., via a control program containing program code stored in a memory 146 coupled to the processor 112, which executes the control program) to power the unit on or off in response to a button press having a duration which exceeds a predetermined value (e.g. 1 to 3 seconds), in order to prevent inadvertently powering the unit on or off.

The MFB 128 may also function to enable pairing to initiate a wireless Bluetooth connection with the mobile device. In certain embodiments, the pairing mode is entered responsive to a button press of a pre-specified duration (e.g., 4-10 seconds). The MFB 128 may also function to re-establish a Bluetooth connection with a previously connected device, e.g., responsive to a quick press (e.g., less than one second).

When the headset 100 is wirelessly connected with a mobile device, but not on a call and if there is no incoming call, the MFB button may serve to start and end voice dialing via the headset 100. When the headset 100 is wirelessly connected with a mobile device, and not on a call, the MFB button may serve to answer or reject an incoming call. For example, a quick press of the MFB 128 may send a command to the mobile device to accept the call and a longer duration button press (e.g., 1-2 seconds) of the MFB 128 may send a command to the mobile device to reject the call.

When the user is on a voice call, the MFB 128 functions as a hang up or call end button by sending a command to the mobile device to terminate the ongoing call. If another incoming voice call is received when the user is on an ongoing voice call, the MFB 128 can be used to accept the incoming voice call immediately, place the incoming voice call on hold, or accept an incoming call that has been placed on hold. For example, a single quick press of the MFB 128 may cause the device 100 to send a command to the mobile device to accept an incoming call and a sequence such as a double quick press of the MFB 128 may cause the device 100 to send a command to the mobile device to place the incoming call on hold. A subsequent sequence such as a double quick press of the MFB 128 may cause the device 100 to send a command to the mobile device to accept an incoming call that was previously placed on hold.

The headset 100 also includes a plurality of functions or commands 150a, 150b, up to any number, n, of functions or commands 150n for controlling the operation of a paired mobile device (e.g., 136, 138) and/or operation of the headset that may be actuated using the configurable button 130. The functions or commands may be stored as program instructions in the memory 146. In certain embodiments, the memory 146 is a non-volatile memory such as ROM, EPROM, EEPROM, flash memory, and so forth. A number of exemplary, user-selectable functions or commands that may be performed responsive to the configurable function button 130 will be described below. The manner of configuring the CFB 130 so that a desired one of the functions or commands 150a-150n will also be described below. It will be recognized that the various functions or commands described herein are exemplary only and are not intended to be an exhaustive listing.

A first exemplary function that may be performed responsive to pressing the CFB 130 is a mute function. In certain embodiments, if the mute function is selected, the CFB 130 operates to toggle the microphone 118 between a muted and an unmuted state. For example, the microphone 118 will be muted responsive to a single press of the button 130 during an unmuted state and the microphone 118 will be unmuted responsive to a single press of the button 130 during a muted state.

A second exemplary function that may be performed responsive to pressing the CFB 130 is a speed dial function. In certain embodiments, a single press of the CFB 130 sends a command to the mobile device to place an outgoing call to a pre-selected number. In certain embodiments, the destination phone number to be dialed is stored in the memory 146 in with association a selected one of the functions or commands 150a-150n when the CFB 130 is configured and provided to the mobile device when the button 130 is pressed. Alternatively, the destination phone number could be a predetermined number stored on the mobile device 136, 138, e.g., in an address book application or module. In certain embodiments, the number is selected from within an associated application (137a, 137b) on the mobile device, such as the BLUEPARROTT™ MySay application available from VXI Corporation of Dover, N.H.

A third exemplary function that may be performed responsive to pressing the CFB 130 is a "call home" function. The call home function is similar to the speed dial function. In certain embodiments, the destination number may be stored in one of the functions 150a-150n and provided by the headset to the mobile device. In alternative embodiments, the number may be a designated number stored on the mobile device, e.g., that may be selected from the address book using an associated application on the mobile device, such as the aforementioned BLUEPARROTT™ MySay application. In certain embodiments, the number is selected based on predetermined criteria, such as the designated entry in a speed dial list or favorites list on the mobile device, a number designated as a "home" number on the mobile device, e.g., in an address book application or function residing on the mobile device 136, 138, an emergency contact telephone number stored on the mobile device, etc.

A fourth exemplary function that may be performed responsive to pressing the CFB 130 is as a dedicated multi-function button for a second connected mobile device when the headset is operating in multi-point mode and is paired and wirelessly connected with two mobile devices. In certain embodiments, the CFB 130 operates to answer an incoming call on the second mobile device and to terminate an ongoing call on the second mobile device.

A fifth exemplary function that may be performed responsive to pressing the CFB 130 is to launch a predetermined application on the mobile device. In certain embodiments, the application is the aforementioned BLUEPARROTT™ MySay application. In alternative embodiments, the application may be an application on the mobile device pre-selectable by the user.

A sixth exemplary function that may be performed responsive to pressing the CFB 130 is a press to talk function, wherein pressing and holding opens the microphone channel and releasing the CFB 130 closes the microphone channel.

A seventh exemplary function that may be performed responsive to pressing the CFB 130 is a record or voice memo function. In certain embodiments, pressing the CFB 130 for some predetermined time period (e.g., 1-2 seconds) initiates a recording function to record from the microphone 118 and store the recording in the memory 146 for later playback. Pressing the CFB 130 (e.g., a single quick press) causes playback of the previously recorded voice memo through the speaker 116. In certain embodiments, multiple voice memos may be recorded and stored in the memory 146. Alternatively, in certain embodiments, the previously recorded voice memo is erased when another voice memo is recorded.

In certain embodiments, the control unit 112 includes an analog-to-digital converter (ADC) which converts an analog input signal from the microphone 118 into digital data for the recording function and a digital-to-analog converter (DAC) for converting the digital data back to an analog output signal for playback by the speaker 116. The control unit 112 may also include a digital signal processor (DSP) for compressing the digital data for storage of the digital recording as an audio file in the memory 146 and decompressing the digital data when it is read from the memory 146 for playback. In certain embodiments, the digital data may be stored in accordance with a known format for digitally representing sampled analog signals, including without limitation PCM, WAV, MP3, and the like.

When the CFB 130 is configured to activate voice memo recording and playback as the pre-selected function, the recording function is active when the CFB 130 is pressed and held for the predetermined time period. Analog signals are transmitted from the microphone 118 to the ADC and DSP and stored in the memory 146. In certain embodiments, the recording function is configured to limit the recording to some maximum length, such as less than 1 minute, or in certain embodiments, less than 15 seconds.

When the CFB 130 is configured to activate voice memo recording and playback as the pre-selected function, the CFB 130 also functions as a playback button to cause playback of a previously recorded voice memo. When the CFB 130 is pressed, the control unit 112 reads the digital data from the memory 146, decompresses the digital data via the DSP and converts the decompressed digital data to an analog signal via the DAC, and sends the analog signal to the audio speaker 116 for audible output.

In certain embodiments, the recording and/or playback functions may be configured to terminate automatically when a pre-specified condition exists. Again, in certain embodiments, the audio recording function may be configured to terminate after a predetermined time period. In certain embodiments, pressing the CFB 130 during a recording operation will terminate the recording. In certain embodiments, an incoming call on the associated mobile device during playback of a previously recorded audio file will cause the headset to terminate playback.

In some embodiments, the ability to record using the CFB 130 is disabled during an ongoing phone call. In other embodiments, the processor 112 may be configured to record during a phone call. In certain embodiments, the processor 112 is configured to record only the headset user's voice input via the microphone 118 and will not record digital data representative of audio received via the Bluetooth module 132. In other embodiments, the processor 112 is configured to record a phone conversation, i.e., the headset user's voice input via the microphone 118 as well as digital data representative of audio received and input to the processor 112 via the Bluetooth module 132.

It will be recognized that in certain embodiments, an audio recording function may also be performed using an audio recording function, such as a voice recorder or voice memo app on the mobile device. For example, one of the user selectable functions of commands 150a-150n to be preconfigured for actuation by the CFB 130, may be a command to launch a voice recorder or voice memo application on the mobile device and initiate recording.

An eighth exemplary function that may be performed responsive to pressing the CFB 130 is to provide audible output of the battery level (state of charge) of the power supply 134. In certain embodiments, when the battery level function is the selected function, pressing the CFB 130 causes the control unit to output the battery level in audible form. The life of the battery may be given in a number of ways, including for example, a quantitative indication of the charge remaining on the battery, such as "low", "medium", or "high," or a quantitative indication such as the percentage of charge remaining on a charge, the amount of time remaining on a charge, e.g., in terms of talk time, standby time, etc., remaining on a charge, or the output voltage of the power supply. The speech output may be generated from digital audio files that have been prerecorded and stored in the memory 146 for later playback via the speaker 116. Alternatively, the speech output may be generated by a synthetic speech generator, such as a text-to-speech output module stored in the memory 146 and executed by the processor 112.

A ninth exemplary function that may be performed responsive to pressing the CFB 130 is to launch a voice recognition or voice assistant program on the mobile device, such as the Siri intelligent personal assistant application in an iOS device 136 or the Google Voice Search intelligent personal assistant feature in the Google Search application on an Android mobile device 138.

A tenth exemplary function that may be performed responsive to pressing the CFB 130 is to send a generic, programmable or user-configurable command to the mobile device that is received by an associated application on the mobile device, such as the aforementioned BLUEPARROTT™ My Say application. The associated application, in turn, triggers a predetermined or pre-selected command or a series of pre-programmed commands.

It is further contemplated that additional functions may be stored on an external device, e.g., on the host computer device 140 and can be stored in the memory 146 of the headset 100 via the USB connection 144, e.g., in connection with a software/firmware update or upgrade.

In certain embodiments, it is contemplated that the CFB 130 may also have additional utility, in addition to actuating the pre-configured one of the functions 150a-150n, as a modifier key to execute still further headset and/or mobile device functions or operations when pressed in combination with one or more of the other keys 124, 126, and 128.

Figure 3:
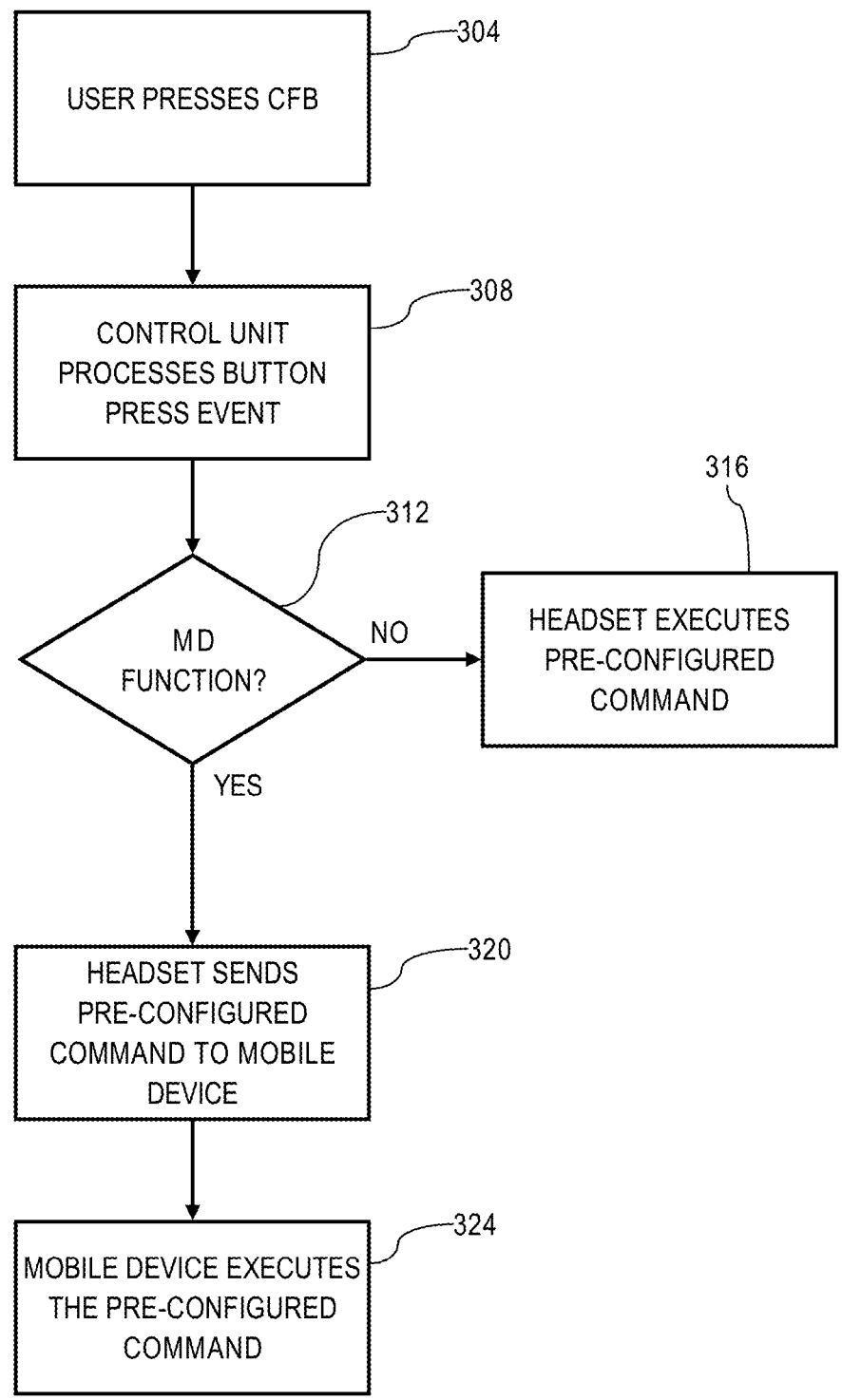
FIG. 3 is a flow chart outlining an exemplary method of operation of the configurable function button in accordance with the present disclosure.

Referring now to FIG. 3, there appears a flow chart outlining an exemplary method of operation of the CFB 130. At step 304, the user manually depresses the CFB 130. At step 308, the control unit 112 processes the button event in accordance with the currently-specified one of the functions 150a-150n. In certain embodiments, when a user has not previously configured the CFB 130, one of the stored commands or functions 150a-150n may be designated as a "default" function or command to be performed until the CFB 130 is configured by the user. In certain embodiments, the default function is the mute function as described above, wherein the CFB 130 operates to toggle the microphone 118 between a muted and unmuted state.

It will be recognized that for certain ones of the functions 150-150n initiating such function requires only a single button press event, e.g., a quick press. It will also be recognized, however, that certain ones of the functions 150a-150n can result in multiple actions. In such cases, the desired action can be initiated by providing multiple button press options recognizable by the controller 112. Such different button press events may vary by number, duration, or both. For example, a single quick press of the CFB 130 may perform one action, a double quick press (e.g., two sequential button down-button up events within some pre-specified time frame) may perform a second action, a triple quick press (e.g., three sequential button down-button up events within some pre-specified time frame) may perform a third action, and so forth.

Similarly, different actions or operations for a given function 150a-150n can be accessed using button presses that are held for different durations. For example, a single quick press of the CFB 130 may perform one action, a single press held for a first predetermined duration (e.g., one to two seconds) may perform a second action, a single press held for a second predetermined duration (e.g., two to three seconds) may perform a third action, etc.

After the controller 112 processes the button press event at step 308 it is determined at step 312 whether the selected one of the functions or commands 150a-150n is a mobile device function or a head set function. If the function to be executed is a function that is to be wholly executed by the headset, the process proceeds to step 316 and the function is performed by the headset. Exemplary functions that are executed by the headset include the voice memo recording function and the audible battery level indicator function, as described above.

If the function is to be executed by the mobile device, the process proceeds to step 320 and the headset sends the function or command to the mobile device via the Bluetooth connection (e.g., 148a, 148b) and the mobile device executes the function or command at step 324.

Figure 4:
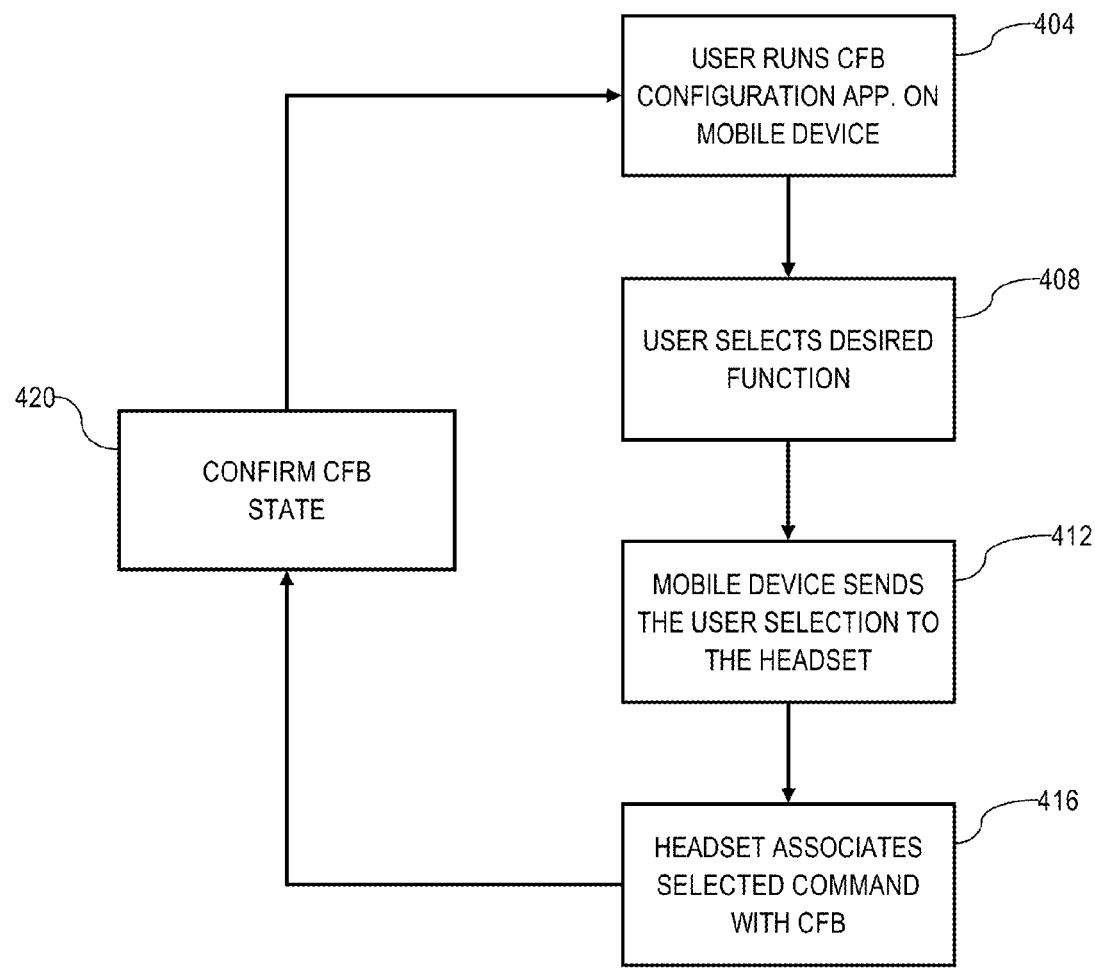
FIG. 4 is a flow chart outlining an exemplary method of configuring the configurable function button in accordance with the present disclosure.

Referring now to FIG. 4, there is shown a flow chart outlining an exemplary process for configuring the CFB 130. An exemplary user interface for programming the CFB appears in FIG. 5. As step 404, the user runs an application on the mobile device. The configuration application may be a dedicated configuration application or may be a function or module within another application. In certain embodiments, the configuration application may be configured as a function, module, or component within an application on the mobile device such as the BLUEPARROTT™ MySay application.

Figure 5:
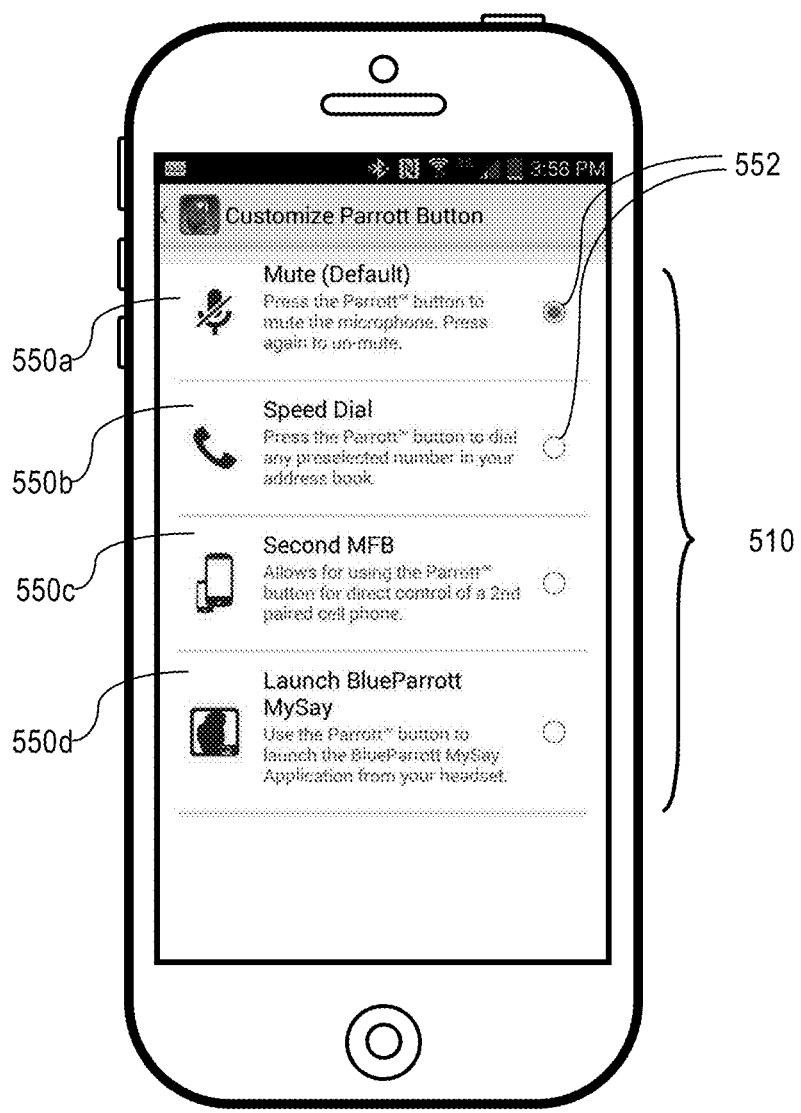
FIG. 5 illustrates an exemplary mobile device and exemplary user interface for customizing the configurable function button herein.

At step 408, the user selects a desired function via the user interface on the mobile device. As shown in FIG. 5, the user interface may include a list or menu 510 of items 550a-550d identifying the selectable commands or functions, each of which corresponds to one of the functions or commands 150a-150n in the memory 146. The user interface appearing in FIG. 5 includes on-screen selectable objects 552 that are selectable using a touch screen interface of the mobile device. The onscreen objects may advantageously be buttons (e.g., radio buttons in the illustrated embodiment), check boxes, and so forth. Although four user-selectable functions appear in the illustrated embodiment of FIG. 5, it will be recognized that any desired number of pre-selected functions may be provided.

At step 412, the mobile device sends the user selection to the headset and at step 416 the headset associates the user-selected command with the CFB 130, e.g., by setting a value in the memory 146. At step 420, the configuration application determines how the CFB is currently configured by reading the present configuration state of the CFB from the memory 146.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A headset device configured to provide an audio input and output mechanism for a mobile device, the headset device comprising:
   a headset body configured to be worn by a user;
   a microphone and a speaker installed on the headset;
   an RF transceiver received within the headset body and configured to perform wireless communication with the mobile device;
   one or more buttons provided on the headset body and configured to be subject to push operations for controlling operation of the headset device, the mobile device, or both;
   a processor received within the headset body, the processor configured to: (a) process a signal input from the microphone and output the processed signal to the RF transceiver; (b) process a signal received from the RF transceiver and output the processed signal to the speaker; and (c) process a signal input according to the push operations of the one or more buttons;
   at least one of the buttons being a configurable function button that is configurable by the user to actuate a selected one of a plurality of functions; and
   a memory received within the headset body and associated with the processor, the memory storing program instructions for executing each of the plurality of functions;
   wherein the selected one of the plurality of functions is pre-selected in response to user input to the processor via a user interface on the mobile device;
   wherein the processor is configured, in response to the configurable function button being pushed, to launch a recorder function on the headset device; and
   wherein the processor is configured to receive an audio signal from the microphone, convert the audio signal into a digital audio file, and store the digital audio file in the memory, in response to the configurable function button being pushed for a time period greater than or equal to a predetermined time period.

2. The headset device of claim 1, wherein the RF transceiver is a Bluetooth transceiver.

3. The headset device of claim 1, wherein the user interface on the mobile device is a graphical user interface.

4. The headset device of claim 3, wherein the graphical user interface includes a list of the plurality of functions.

5. The headset device of claim 1, wherein the mobile device is selected from an Android smartphone and an iPhone smartphone.

6. The headset device of claim 1, wherein one of said plurality of functions is a mute function operable to cause the processor to toggle the microphone between a muted and an unmuted state responsive to the configurable function button being pressed.

7. The headset device of claim 1, wherein one of said plurality of functions is a speed dial function operable to cause the processor to send a command to the mobile device to place an outgoing call to a pre-selected telephone number.

8. The headset device of claim 7, wherein the pre-selected telephone number is selected from the group consisting of a telephone number designated as the user's home number, a designated entry in a speed dial list or favorites list on the mobile device, or a last telephone number dialed by the mobile device.

9. The headset device of claim 1, wherein the processor is configured, in response to the headset device being paired with both said mobile device and another mobile device and the configurable function button being pushed, to control an operation of the other mobile device.

10. The headset device of claim 9, wherein the processor is configured, in response to the headset device being paired with another mobile device and the configurable function button being pushed, to end a call on the other mobile device if the other mobile device is on an ongoing call and to answer a call on the other mobile device if the other mobile device has an incoming call.

11. The headset device of claim 1, wherein the processor is configured, in response to the configurable function button being pushed, to launch a pre-selected application on the mobile device.

12. The headset device of claim 11, wherein the configurable function button is configurable via user input to said pre-selected application.

13. The headset device of claim 1, wherein the processor is configured, in response to the configurable function button being pushed, to launch a voice recognition function on the mobile device.

14. The headset device of claim 1, wherein the processor is configured, in response to the configurable function button being pushed, to open a microphone channel between the microphone and the processor and, in response to the configurable function button being released, to close a microphone channel between the microphone and the processor.

15. The headset device of claim 1, wherein the processor is configured to receive a previously stored digital audio file from the memory and convert the digital audio file into an analog audio signal for output to the speaker, in response to the configurable function button being pushed for a time period less than a predetermined time period.

16. The headset device of claim 1, wherein the processor is configured, in response to the configurable function button being pushed, to provide an audio signal to the speaker representative of a state of charge of a battery received within the housing.

17. A method for configuring a headset device, the headset device configured to provide an audio input and output mechanism for a mobile device, the method comprising:

providing the headset device, the headset device having a headset body configured to be worn by a user, a microphone and a speaker installed on the headset, an RF transceiver received within the headset body and configured to perform wireless communication with the mobile device, and one or more buttons on the headset body and configured to be subject to push operations, and a processor received within the headset body, the processor configured to: (a) process a signal input from the microphone and output the processed signal to the RF transceiver; (b) process a signal received from the RF transceiver and output the processed signal to the speaker; and (c) process a signal input according to the push operations of the one or more buttons;

storing, in a memory received within the headset body and associated with the processor, program instructions for executing a plurality of functions for controlling operation of the headset device, the mobile device, or both;

providing, using the mobile device, a user interface for selecting one of the plurality of functions, wherein at least one of the buttons is configured to actuate the selected one of the functions, the selected one of the plurality of functions being pre-selected in response to user input to the processor via the user interface on the mobile device;

the program instructions, in response to the configurable function button being pushed, launching a recorder function on the headset device; and the program instructions, in response to the configurable function button being pushed for a time period greater than or equal to a predetermined time period, receiving an audio signal from the microphone, converting the audio signal into a digital audio file, and storing the digital audio file in the memory.

\* \* \* \* \*